United States Patent
Lee

(10) Patent No.: US 11,301,393 B2
(45) Date of Patent: Apr. 12, 2022

(54) DATA STORAGE DEVICE, OPERATION METHOD THEREOF, AND STORAGE SYSTEM INCLUDING THE SAME

(71) Applicant: SK hynix Inc., Gyeonggi-do (KR)

(72) Inventor: Joung Young Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 70 days.

(21) Appl. No.: 16/591,257

(22) Filed: Oct. 2, 2019

(65) Prior Publication Data
US 2020/0192815 A1    Jun. 18, 2020

(30) Foreign Application Priority Data

Dec. 17, 2018 (KR) .......................... 10-2018-0162875

(51) Int. Cl.
*G06F 12/1009* (2016.01)
*G06F 12/0875* (2016.01)

(52) U.S. Cl.
CPC ...... *G06F 12/1009* (2013.01); *G06F 12/0875* (2013.01); *G06F 2212/1044* (2013.01); *G06F 2212/608* (2013.01)

(58) Field of Classification Search
None
See application file for complete search history.

(56) References Cited

U.S. PATENT DOCUMENTS

| | | | | |
|---|---|---|---|---|
| 6,141,731 A | * | 10/2000 | Beardsley | G06F 12/123 711/133 |
| 8,615,635 B2 | * | 12/2013 | Rakic | G06F 16/2379 711/133 |
| 2014/0108731 A1 | * | 4/2014 | Sardashti | G06F 12/0223 711/122 |
| 2014/0195730 A1 | * | 7/2014 | Feekes | G11C 7/24 711/105 |
| 2016/0147670 A1 | * | 5/2016 | Li | G06F 12/1009 711/206 |
| 2016/0335188 A1 | * | 11/2016 | Romanovskiy | G06F 3/064 |
| 2017/0068621 A1 | * | 3/2017 | Watanabe | G06F 12/0871 |
| 2017/0185645 A1 | * | 6/2017 | Agarwal | G06F 12/0238 |
| 2017/0277638 A1 | * | 9/2017 | Busayarat | G06F 12/0864 |

(Continued)

FOREIGN PATENT DOCUMENTS

| KR | 101626218 | 6/2016 |
|---|---|---|
| KR | 1020160144577 | 12/2016 |

*Primary Examiner* — Yaima Rigol
(74) *Attorney, Agent, or Firm* — IP & T Group LLP

(57) ABSTRACT

A data storage device may include a storage; and a controller, wherein the controller comprises: an address translator configured to generate multiple map data, each including a physical address of the storage corresponding to a logical address and multiple meta data for the multiple map data respectively; a descriptor cache manager configured to add new meta data to a storage area of a descriptor cache, the storage area for the new meta data being physically continuous with a storage area in which last meta data, of the multiple meta data, is stored and assign a head pointer and a tail pointer to select positions in the descriptor cache; a map cache manager configured to store the multiple map data in a map cache; and a map search component configured to search the descriptor cache according to a search range determined by the head pointer and the tail pointer.

36 Claims, 13 Drawing Sheets

(56) References Cited

U.S. PATENT DOCUMENTS

| | | | |
|---|---|---|---|
| 2018/0150991 A1* | 5/2018 | Tannenbaum | G06T 15/005 |
| 2018/0329651 A1* | 11/2018 | Chang | G06F 3/0659 |
| 2019/0286570 A1* | 9/2019 | Miura | G06F 12/0864 |
| 2019/0324913 A1* | 10/2019 | Chhabra | G06F 21/79 |
| 2020/0104262 A1* | 4/2020 | Das | G06F 12/0811 |

\* cited by examiner

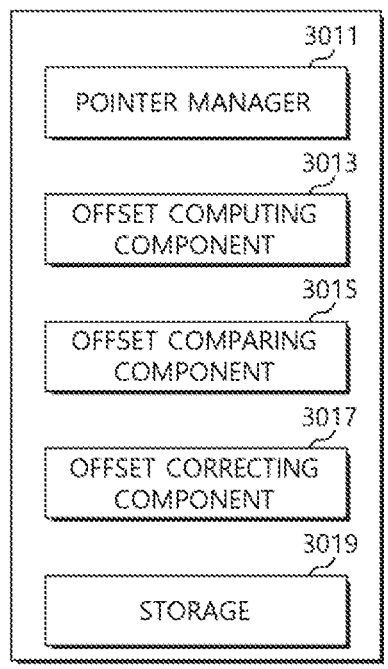

DATA STORAGE DEVICE, OPERATION METHOD THEREOF, AND STORAGE SYSTEM INCLUDING THE SAME

CROSS-REFERENCE TO RELATED APPLICATION

The present application claims priority under 35 U.S.C. § 119(a) to Korean application number 10-2018-0162875, filed on Dec. 17, 2018, which is incorporated herein by reference in its entirety.

BACKGROUND

1. Technical Field

Various embodiments generally relate to a semiconductor integrated apparatus, and, more particularly, to a data storage device, an operation method thereof, and a storage system including the same.

2. Related Art

A data storage device is electrically connected to a host device and performs a data input and output (input/output) operation at a request of the host device. The data storage device may use various storage media in order to store data.

A data storage device may store data in a magnetic disk such as a hard disk drive (HDD), or in a semiconductor memory device such as a solid state drive (SSD) or a memory card, particularly, a nonvolatile memory.

A storage medium using a flash memory is advantageous in that it has large capacity, nonvolatility, low unit cost, low power consumption, and high data processing speed.

In the case of a data storage device, such as a flash memory, in which overwrite or in-place update is not possible, a logical address provided together with a request (e.g., a read request or a write request) of a host device needs to be mapped to a physical address to process the request of the host device.

Therefore, addition of new address mapping information and retrieval of address mapping information at the request of the host device may be one of important factors for determining the performance of the data storage device.

SUMMARY

In an embodiment, a data storage device may include: a storage; and a controller configured to control the storage in response to a request received from a host device, wherein the controller comprises: an address translator configured to generate multiple map data, each including a physical address of the storage corresponding to a logical address and multiple meta data for the multiple map data respectively; a descriptor cache manager configured to add new meta data to a storage area of a descriptor cache, the storage area for the new meta data being physically continuous with a storage area in which last meta data, of the multiple meta data, is stored and assign a head pointer and a tail pointer to select positions in the descriptor cache; a map cache manager configured to store the multiple map data in a map cache; and a map search component configured to search the descriptor cache according to a search range determined by the head pointer and the tail pointer.

In an embodiment, an operation method of a data storage device including a storage and a controller for controlling data input/output to/from the storage at a request transmitted from a host device and including a map search component, may include: generating, by the controller, multiple map data, each including a physical address of the storage corresponding to a logical address and multiple meta data for the multiple map data, in response to a request of a host device; adding, by the controller, new meta data to a storage area of a descriptor cache, the storage area for the new meta data being physically continuous with a storage area in which last meta data, of the multiple meta data, is stored; assigning, by the controller, a head pointer and a tail pointer to select positions in the descriptor cache; storing, by the controller, the multiple map data in a map cache; and searching, by the controller, the descriptor cache according to a search range determined by the head pointer and the tail pointer.

In an embodiment, a storage system may include: a host device; a storage; and a controller configured to control data input/output to/from the storage at a request transmitted from the host device, wherein the controller is configured to generate map data including physical address information corresponding to a logical address and meta data for the map data, at a write request of the host device, add the meta data into an address area physically continuous in a descriptor cache, and search for the descriptor cache according to a search range determined by a head pointer and a tail pointer.

In an embodiment, a storage device may include: a storage; and a controller suitable for controlling the storage in response to a request from a host device, wherein the controller comprises: a data generator suitable for generating multiple map data, each map data including a physical address of the storage corresponding to a logical address associated with the request, and multiple meta data for the multiple map data respectively; a map cache suitable for storing the multiple map data; a meta cache suitable for storing the multiple meta data, each meta data including indication information indicating an area of the map cache for corresponding map data; a data manager suitable for storing the multiple map data in the map cache, storing the multiple meta data in the meta cache, generating a head pointer indicating a head area of the meta cache in which first meta data among the multiple meta data is stored, and a tail pointer indicating a tail area of the meta cache in which next meta data immediately subsequent to last meta data among the multiple meta data is to be stored, and searching meta data in a search area of the meta cache between the head pointer and the tail pointer.

In an embodiment, an operation method of a data storage device may include: generating multiple map data, each map data including a physical address of the storage corresponding to a logical address associated with the request, and multiple meta data for the multiple map data respectively, each meta data including indication information indicating an area of the map cache for corresponding map data; storing the multiple map data in a map cache and the multiple meta data in a meta cache; generating a head pointer indicating a head area of the meta cache in which first meta data among the multiple meta data is stored, and a tail pointer indicating a tail area of the meta cache in which next meta data immediately subsequent to last meta data among the multiple meta data is to be stored; and searching meta data in a search area of the meta cache between the head pointer and the tail pointer.

BRIEF DESCRIPTION OF THE DRAWINGS

FIG. 3 is diagram illustrating a descriptor cache manager in accordance with an embodiment.

FIG. 4 is a diagram illustrating meta data of map data in accordance with an embodiment.

DETAILED DESCRIPTION

A data storage device, an operation method thereof, and a storage system including the same are described below with reference to the accompanying drawings through various embodiments. Throughout the specification, reference to "an embodiment" or the like is not necessarily to only one embodiment, and different references to any such phrase are not necessarily to the same embodiment(s).

Figure 1:
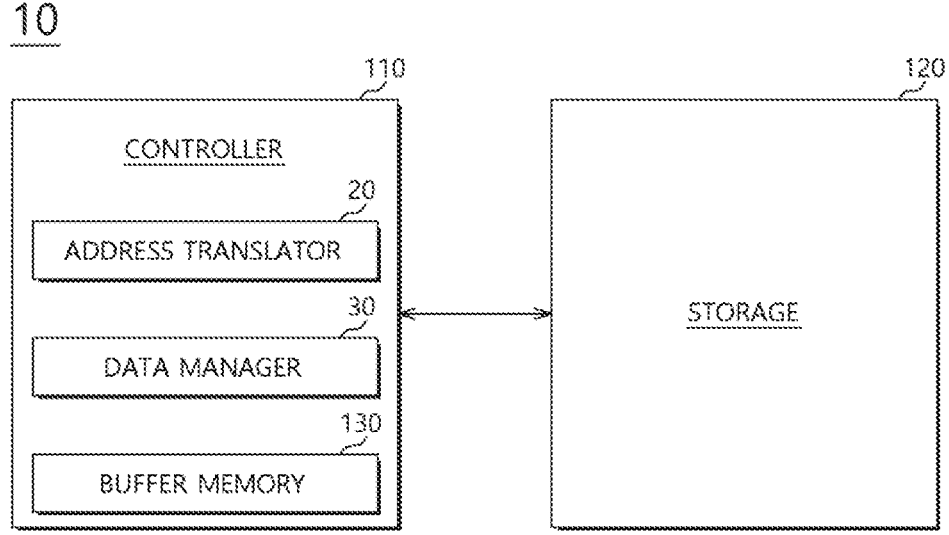
FIG. 1 is a diagram illustrating a data storage device in accordance with an embodiment.

FIG. 1 is a diagram illustrating a data storage device 10 in accordance with an embodiment.

Referring to FIG. 1, the data storage device 10 may include a controller 110 and a storage 120.

The controller 110 may control the storage 120 in response to a request, which is received from a host device (not shown). For example, the controller 110 may direct data to be programmed in the storage 120 in response to a program (or write) request of the host device. Furthermore, the controller 110 may provide the data written in the storage 120 to the host device in response to a read request of the host device.

The storage 120 may write data therein or output written data under the control of the controller 110. The storage 120 may include a volatile or nonvolatile memory device. In an embodiment, the storage 120 may be implemented using any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and/or a spin transfer torque magnetic RAM (STT-MRAM). The storage 120 may include a plurality of memory devices. Each of the memory devices may be composed of a plurality of dies, a plurality of chips, or a plurality of packages. The plurality of memory devices may be electrically connected to the controller 110 through a plurality of channels. Each memory device may be electrically connected to the controller 110 through its own channel, or multiple memory devices may share the same channel. The memory devices electrically connected to one channel may be electrically connected to the same signal bus and data bus.

The storage 120 may include a memory cell array. Each cell in the array may be a single-level cell that stores one-bit data or a multi-level cell that stores multi-bit data.

In various embodiments, the storage 120 may be implemented with a NAND flash memory. The NAND flash memory is a non-overwritable memory device in which an erase operation needs to be performed before data is written. Furthermore, a program operation of the NAND flash memory may be performed in units of pages and an erase operation may be performed in units of blocks. Therefore, at the time of an update request of the host device, a page stored with original data is substantially maintained as is and update data is programmed at a new position. Accordingly, when the storage 120 is configured as the NAND flash memory, it is necessary to manage mapping information (i.e., map data) between a logical address received from the host device and a physical address of the storage 120. As the address mapping technique, a page mapping technique, a block mapping technique, or a hybrid mapping technique may be used according to a unit of an address area to be mapped.

In an embodiment, the controller 110 may include a buffer memory 130, an address translator 20, and a data manager 30.

The buffer memory 130 may serve as a space capable of temporarily storing data when the data storage device 10 performs a series of operations such as a program operation and a read operation in cooperation with the host device. Although FIG. 1 illustrates an arrangement in which the buffer memory 130 is embedded in the controller 110, it is noted that the buffer memory 130 may be provided externally to the controller 110.

The address translator 20 may receive a logical address corresponding to a write request of the host device, and translate the logical address into a physical address of the storage 120 corresponding to the logical address. The address translator 20 may generate map data and meta data on the basis of the physical address.

The data manager 30 may store the map data and the meta data generated by the address translator 20 in specific areas.

Furthermore, the data manager 30 may search for a physical address corresponding to a logical address by referring to the data manager 30 in response to a read request of the host device.

As the host device provides the data storage device 10 with write data and a write command including at least one logical address, the address translator 20 of the controller 110 may translate the logical address received from the host device into a physical address. Further, the address translator 20 may generate map data and meta data corresponding to the map data. The data manager 30 may store the map data and the meta data generated as the address translation result at specific positions. Then, the controller 110 may transmit the physical address and the write data to the storage 120 and request a program operation to be performed. In various embodiments, the map data and the meta data may be stored in specific storage spaces or areas within the controller 110, such as the buffer memory 130 or a memory (e.g., a random access memory (RAM) 1153 of FIG. 2). The RAM 1153 may be implemented with a dynamic random access memory (DRAM) or a static random access memory (SRAM). In various embodiments, storage areas for storing map data may be referred to as a map cache, and storage areas for storing meta data may be referred to as a descriptor cache (or meta cache).

In an embodiment, meta data may be generated when the address translator 20 translates the logical address into the physical address. Each meta data may include a descriptor and an offset for the corresponding map data as shown in FIG. 4. The descriptor may include a descriptor identifier (ID), an index (Index) which is a head value of a logical address for the corresponding map data, a compression rate (Rate) of the corresponding map data, and size information (Size) of the corresponding map data in the compressed state. The offset may be information indicating an area where the corresponding map data is stored, for example, a start address Start (ADD) of a map cache.

New map data, which is generated in response to the write request of the host device, may be stored in a specific space, for example, the map cache. The meta data corresponding to the new map data may be stored in a specific space, for example, a descriptor cache. In an embodiment, the descriptor cache may include a ring buffer.

As the host device transmits a read command including at least one logical address to the data storage device 10, the data manager 30 of the controller 110 may retrieve meta data having a head value of the logical address as an index. Further, the data manager 30 may extract information about a storage position (i.e., an offset and a size) of corresponding map data, access that storage position, and search for a physical address corresponding to the logical address. The storage 120 may receive the physical address found in the search, read data from a memory cell corresponding to that physical address, and transmit the read data to the controller 110. The controller 110 may receive the read data and transfer that read data to the host device.

When the address translator 20 initially generates map data and corresponding meta data, the map data may be stored in a map cache. Storage areas of the map cache may include areas from an area corresponding to an offset of the initial map data to an area corresponding to the size of the initial map data.

The meta data for the initial map data may be stored in the descriptor cache. Furthermore, a head pointer may be assigned to a storage area of the initial meta data in the descriptor cache, and a tail pointer may be assigned to a next area in the descriptor cache, the next area being physically continuous with the storage area of the initial meta data.

In an embodiment, an offset (or a start address) of a map cache area stored with the initial map data may be referred to as a head offset. A position obtained by adding the size of the map data to its start address may be referred to as an end offset. An end offset of last stored map data may be referred to as a tail offset. This is summarized as follows.

TABLE 1

| Term | Definition |
| --- | --- |
| Head pointer | Indicates initial meta data storage area of descriptor cache |
| | Maintained or changed when new meta data is added |
| Tail pointer | Indicates a next meta data storage area of descriptor cache, which is immediately after the last used meta data storage area |
| | Changed to next address area when new meta data is added |
| Offset | Start address of map cache area stored with map data |
| | Assigned for each new map data |
| Head offset | Offset of map data indicated by head pointer |
| End offset | Address obtained by adding size of map data to start address of map data |
| Tail offset | End offset of last map data before new meta data is added |

Meta data added to the descriptor cache with the generation of new map data may be stored in a physically continuous space in the descriptor cache. In another aspect, meta data corresponding to the new map data may be stored in a space having an address continuous with the descriptor cache space where meta data corresponding to map data generated at a previous time is stored.

That is, as a result of the way in which meta data is stored in the descriptor cache, there is no empty storage space between any two filled meta data storage spaces in the descriptor cache.

Specifically, when new map data and corresponding meta data are generated, the new meta data is stored at a position of the tail pointer of the descriptor cache, so that the position of the tail pointer may be changed to a position indicating a next area in the descriptor cache. Furthermore, on the basis of the offset and the size of the new map data, the position of the head pointer of the descriptor cache may be maintained or changed.

Since the capacity of the map cache is limited, the storage position of the new map data may be updated by wrapping around the map cache.

In an embodiment, when the tail offset is greater than the head offset, it may be determined that wraparound has not yet occurred. When the tail offset is less than the head offset, it may be determined that wraparound has occurred.

Before the map cache is wrapped around, when the size of the new map data is storable in an area after the tail offset, the new map data may be added to the map cache and position of the head pointer may be maintained as is. On the other hand, when the size of the new map data is not storable in the area after the tail offset, it is necessary to store the map data by wrapping around the map cache.

When the map cache is wrapped around, previously stored map data may be updated to new map data, and the position of the head pointer may be maintained or changed according to the offset and the size of the new map data.

In brief, the new map data may be stored over a corresponding area of the map cache according to the offset and the size thereof.

The meta data corresponding to the new map data may be added to the position of the tail pointer of the descriptor cache, and then the position of the tail pointer may be increased.

The position of the head pointer may be maintained or changed according to a result obtained by comparing the end offset and the head offset of the new map data with each other.

For example, the position of the head pointer may be maintained in a pre-wraparound situation in which the end offset is less than the maximum value of the map cache and the tail offset is greater than the head offset.

When the end offset is greater than the maximum value of the map cache, the end offset may be corrected. In an embodiment, the correction of the end offset may be performed in a manner such that the maximum value of the map cache is subtracted from the end offset; however, the present invention is not limited thereto.

In a post-wraparound situation in which the tail offset is less than the head offset, the position of the head pointer may be changed or maintained according to a result obtained by comparing the end offset or the corrected end offset and the head offset corresponding to the head pointer with each other.

As described above, the meta data for each corresponding map data may be continuously stored in the descriptor cache and a search position or area of the descriptor cache may be determined by the head pointer and the tail pointer. The map data may be stored while wrapping around the map cache, and the position of the head pointer of the descriptor cache may be maintained or changed on the basis of the offset and the size of the map data.

Accordingly, the descriptor cache may be managed such that the meta data storage area is physically continuous. Furthermore, when searching for map data, it is possible to search for meta data including the head value of the logical address provided from the host device and the offset, the size, and the compression rate at a high speed while searching between the head pointer and the tail pointer of the descriptor cache.

Figure 2:
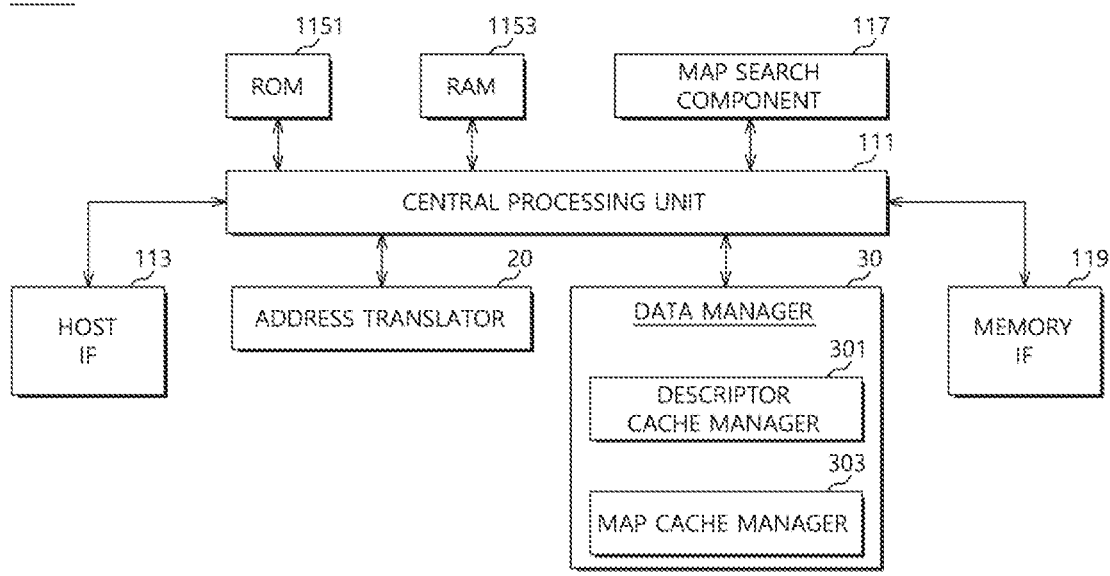
FIG. 2 is a diagram illustrating a controller in accordance with an embodiment.

FIG. 2 is a diagram illustrating a controller, e.g., controller 110 of FIG. 1, in accordance with an embodiment.

Referring to FIG. 2, the controller 110 may include a central processing unit (CPU) 111, a host interface (IF) 113, a read only memory (ROM) 1151, a random access memory (RAM) 1153, a map search component 117, a memory interface (IF) 119, the address translator 20, and the data manager 30.

The CPU 111 may be configured to transfer various types of control information for a data read or write operation for the storage 120 to the host IF 113, the RAM 1153, and the memory IF 119. In an embodiment, the CPU 111 may operate according to firmware provided for various operations of the data storage device 10. The firmware may be stored in the ROM 1151 or the storage 120, and may be loaded into the RAM 1153 at the time of booting of the data storage device 10.

In an embodiment, the CPU 111 may perform a function of a flash translation layer (FTL) for performing garbage collection and wear leveling for managing the storage 120, and an error check and correction (ECC) function of detecting and correcting an error of data read from the storage 120.

The host IF 113 may provide a communication channel for receiving a command and a clock signal from the host device and controlling data input/output under the control of the CPU 111. Particularly, the host IF 113 may provide a physical connection between the host device and the data storage device 10. The host IF 113 may provide interfacing with the data storage device 10 according to a bus format of the host device. The bus format of the host device may include at least one of various standard interface protocols, such as a secure digital (SD), a universal serial bus (USB), a multi-media card (MMC), an embedded MMC (eMMC), a personal computer memory card international association (PCMCIA), a parallel advanced technology attachment (PATA), a serial advanced technology attachment (SATA), a small computer system interface (SCSI), a serial attached SCSI (SAS), a peripheral component interconnection (PCI), a PCI express (PCI-e or PCIe), and a universal flash storage (UFS).

The ROM 1151 may store program codes required for an operation of the controller 110, for example, firmware or software, and store code data used by the program codes.

The RAM 1153 may store data for the operation of the controller 110 or data generated by the controller 110 or the address translator 20.

In a booting operation, the CPU 111 may load a boot code stored in the storage 120 or the ROM 1151 to the RAM 1153, thereby controlling the booting operation of the data storage device 10.

The memory IF 119 may provide a communication channel for signal transmission/reception between the controller 110 and the storage 120. The memory IF 119 may write data, which has been temporarily stored in the buffer memory 130, in the storage 120 under the control of the CPU 111. Furthermore, the memory IF 119 may transfer data read from the storage 120 to the buffer memory 130 for temporary storage.

The address translator 20 may assign a physical address corresponding to a logical address in response to the write request of the host device and generate map data and meta data on the basis of the physical address.

The data manager 30 may store the map data and the meta data generated by the address translator 20 in specific areas.

The data manager 30 may include a descriptor cache manager 301 and a map cache manager 303.

The descriptor cache manager 301 may add meta data such that there is no an empty storage space between the meta data storage spaces in the descriptor cache. The descriptor cache manager 301 may assign the head pointer to an initial meta data storage area in the descriptor cache, and assign the tail pointer to an area physically continuous with the head pointer, that is, an area having a physically continuous address. When new map data and meta data corresponding to the new map data are generated, the descriptor cache manager 301 may store new meta data at the position of the tail pointer of the descriptor cache, and change the position of the tail pointer to a position indicating a next area in the descriptor cache. Furthermore, the descriptor cache manager 301 may substantially maintain or change the position of the head pointer of the descriptor cache on the basis of the offset and the size of the new map data.

The map cache manager 303 may store the map data, which is generated by the address translator 20, in areas of the map cache. These areas may be determined from a map cache area corresponding to the offset of the map data to an area corresponding to the size of the map data.

The map search component 117 may search for a physical address corresponding to the logical address provided by the host device by referring to the data manager 30 in response to the read request of the host device. In an embodiment, when an address search is performed, the map search component 117 may search a range from the head pointer to the tail pointer of the descriptor cache, and search for meta data including an index corresponding to the head value of the logical address provided from the host device. Further, the map search component 117 may extract map data from the map cache on the basis of an offset and a size included in the meta data identified in the search.

Figure 2A:
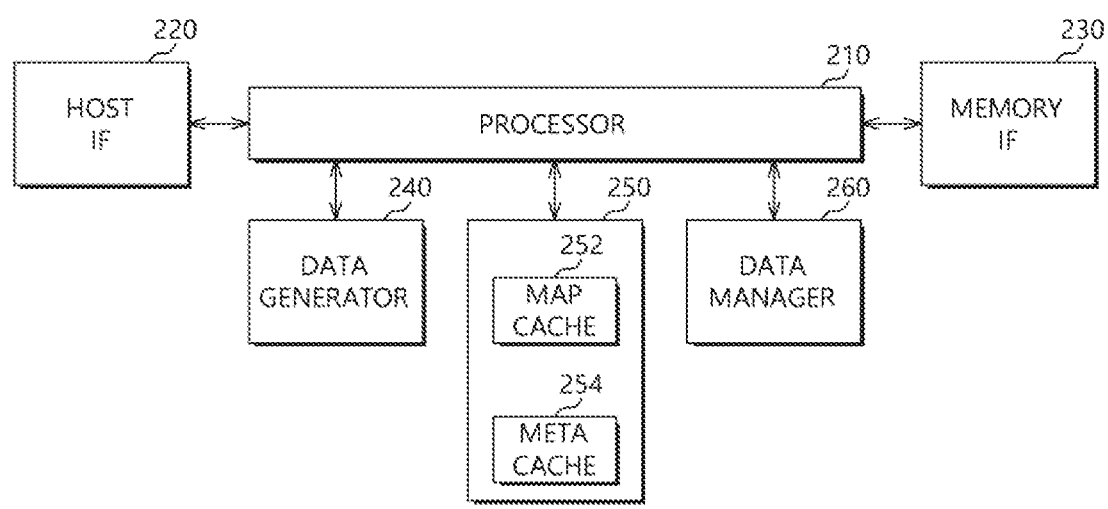
FIG. 2A is a diagram illustrating a controller in accordance with an embodiment.

FIG. 2A is a diagram illustrating a controller, e.g., controller 110 of FIG. 1, in accordance with an embodiment.

Referring to FIG. 2A, the controller 110 may include a processor 210, a host interface (IF) 220, a memory interface (IF) 230, a data generator 240, a memory 250 and a data manager 260. The processor 210, the host interface 220, and the memory interface 230 may correspond to the CPU 111, the host IF 113, and the memory IF 119 of FIG. 2, respectively.

The data generator 240 may generate multiple pieces of map data in response to one or more requests received from a host device through the host interface 220. Further, the data generator 240 may generate multiple pieces of meta data corresponding to the multiple pieces of map data. Each piece of map data may include information indicating a mapping relation between a logical address associated with the request and a physical address of the storage 120 in FIG. 1 corresponding to the logical address. The pieces or segments of map data (multiple map data) may be part of a longer continuous segment of map data. The pieces or segments of meta data (multiple meta data) also may be part of a longer continuous segment of meta data.

The memory 250 may include a map cache 252 and a meta cache (or a descriptor cache) 254. The map cache 252 may store the multiple map data. The meta cache 254 may store the multiple meta data. Each meta data may include, as information for describing the corresponding map data, indication information indicating an area of the map cache 252 for corresponding map data. In various embodiments, the memory 250 may be implemented with a random access memory (RAM). In various embodiments, as shown in FIGS. 6 to 10, the meta cache 254 may be implemented with a ring buffer to seamlessly store the multiple meta data.

In various embodiments, as shown in FIG. 4, each meta data may include a descriptor including identifier (ID) and size information (Size) of the corresponding map data, and the indication information (Start ADD) indicating a start address of a corresponding area of the map cache for the corresponding map data. The descriptor may further include a compression rate (Rate) of the corresponding map data and index (Index) indicating a logical address for the corresponding map data.

The data manager 260 may manage operations of storing the multiple map data in the map cache 252 and storing the multiple meta data in the meta cache 254. Further, as shown in FIGS. 6 to 10, the data manager 260 may generate a head pointer (Head) and a tail pointer (Tail) and search meta data in a search area of the meta cache 252 between the head pointer and the tail pointer.

In various embodiments, the head pointer may indicate a head area of the meta cache 254 in which first meta data among the multiple meta data is stored. For example, in FIG. 6, the head pointer may indicate a head area (i.e., an area corresponding to Start ADD 0) of the meta cache 254 in which first meta data (ID=0) among the multiple meta data is stored. The tail pointer may indicate a tail area of the meta cache 254 in which next meta data (immediately subsequent to last meta data) among the multiple meta data is to be stored. For example, in FIG. 6, the tail pointer may indicate a tail area (i.e., a next area subsequent to an area corresponding to Start ADD 14) of the meta cache 254 in which a next meta data subsequent to last meta data (ID=3) among the multiple meta data is to be stored.

In various embodiments, the data manager 260 may search map data in areas, which are determined based on indication information of the searched meta data. For example, in FIG. 6, the meta cache 254 may be searched according to a search range from the head pointer to the tail pointer, and the map cache 252 may be searched in an area from a head offset (or address) 0 to a tail offset 16, corresponding to the search range of the meta cache 254.

In various embodiments, when next map data corresponding to the next meta data is generated and the map cache is not full, the data manager 260 may store the next map data in a next area of the map cache 252, store the next meta data in the tail area of the meta cache 254, maintain the head pointer and increase the tail pointer to indicate a next area of the meta cache 254, which is subsequent to the tail area. For example, in FIG. 7, when a next map data Desc.4 corresponding to the next meta data (ID=4) is generated and the map cache 252 is not full, the data manager 260 may store the next map data Desc.4 in a next area (i.e., an area between 16 to 17) of the map cache 252, store the next meta data in the tail area (i.e., an area corresponding to Start ADD 16) of the meta cache 254. Further, the data manager 260 may maintain the head pointer and increases the tail pointer to indicate a next area (i.e., a next area subsequent to an area corresponding to Start ADD 16) of the meta cache 254, which is subsequent to the tail area.

In various embodiments, when next map data corresponding to the next meta data is generated and the map cache 252 is full, the data manager 260 may delete first map data in a first area of the map cache 252, store the next map data in the first area of the map cache 252, delete first meta data in the head area of the meta cache 254, and store the next meta data in the head area of the meta cache 254. For example, in FIG. 8, when next map data Desc.5 corresponding to the next meta data (ID=5) is generated and the map cache 252 is full, the data manager 260 may delete first map data Desc.0 in a first area (i.e., an area between 0 to 8) of the map cache 252, and store the next map data Desc.5 in the first area of the map cache 252. Further, the data manager 260 may delete first meta data (ID=0) in the head area of the meta cache 254, and store the next meta data (ID=5) in the tail area (i.e., an area corresponding to Start ADD 17) of the meta cache 254. Furthermore, the data manager 260 may increase the position of the head pointer to indicate a second area of the meta cache 254, and increases the position of the tail pointer to indicate a next area of the meta cache 254. For example, in FIG. 8, the data manager 260 may increase the head pointer to indicate the second area (i.e., an area corresponding to Start ADD 8) of the meta cache 254, which is subsequent to the head area, and increase the position of the tail pointer to indicate a next area of the meta cache 254, which is subsequent to the tail area (i.e., an area corresponding to Start ADD 17).

FIG. 3 is a diagram illustrating a descriptor cache manager, e.g., the descriptor cache manager 301 of FIG. 3, in accordance with an embodiment.

Referring to FIG. 3, the descriptor cache manager 301 may include a pointer manager 3011, an offset computing component 3013, an offset comparing component 3015, an offset correcting component 3017, and a storage 3019. The storage 3019 may include a descriptor cache (or meta cache) and store meta data corresponding to initially generated map data in the descriptor cache. Alternatively, the descriptor cache may be included in the buffer memory 130 or the RAM 1153 of the controller 110 or the storage 120 in FIG. 1.

The pointer manager 3011 may generate and assign a head pointer and a tail pointer, as the storage 3019 stores meta data corresponding to initially generated map data in the descriptor cache. The head pointer may be assigned to the initial meta data storage area in the descriptor cache. The tail pointer may be assigned to an area physically continuous with that associated with the head pointer.

When meta data corresponding to new map data is generated, the storage 3019 may store new meta data at the position of the tail pointer in the descriptor cache. The new meta data may be stored physically continuous with the last meta data indicated by the tail pointer, and the pointer manager 3011 may change the position of the tail pointer in accordance with the new meta data. Furthermore, the pointer manager 3011 may substantially maintain or change the position of the head pointer in the descriptor cache on the basis of the offset and the size of the new map data.

Before the map cache is wrapped around (i.e., the map cache is not full), when the size of the new map data is storable in an area after the tail offset, the pointer manager 3011 may substantially maintain the position of the head pointer as is. On the other hand, when the size of the new map data is not storable in the area after the tail offset, the pointer manager 3011 may substantially maintain or change the position of the head pointer according to the offset and the size of the new map data.

The offset computing component 3013 may compute an end offset for the new map data. In an embodiment, the end offset may be a value obtained by adding a size to an offset of map data; however, the present invention is not limited thereto.

The offset comparing component 3015 may compare the end offset with the maximum value of the map cache, compare the tail offset with the head offset, or compare the end offset with the head offset.

Depending on a result obtained by comparing the end offset with the maximum value of the map cache by the offset comparing component 3015, the end offset may be corrected or the tail offset and the head offset may be compared with each other. Depending on a result obtained by comparing the tail offset with the head offset by the offset comparing component 3015, the pointer manager 3011 may substantially maintain the position of the head pointer or the offset comparing component 3015 may compare the end offset with the head offset. Depending on a result obtained by comparing the end offset with the head offset, the pointer manager 3011 may substantially maintain or change the position of the head pointer.

The offset correcting component 3017 may correct the end offset when the end offset is greater than the maximum value of the map cache. In an embodiment, the correction of the end offset may be performed in a manner such that the maximum value of the map cache is subtracted from the end offset; however, the present invention is not limited thereto.

FIG. 4 is a diagram illustrating meta data in accordance with an embodiment.

The meta data may be generated with map data when the address translator 20 of FIGS. 1 and 2 translates the logical address into the physical address. The meta data may include a descriptor and an offset for corresponding map data. The descriptor may include a descriptor identifier (ID), an index (Index) which is a head value of the logical address for each map data, a compression rate (Rate) of map data, and size information (Size) of compressed map data. The offset may be information indicating an area where the map data is stored, for example, the start address Start ADD of the map cache.

In an embodiment, the address translator 20 may compress the map data in a run-length scheme; however, the present invention is not limited thereto. The map data may be compressed by various methods, and may be decoded by storing a compression rate according to an applied compression method as a descriptor.

Figure 5:
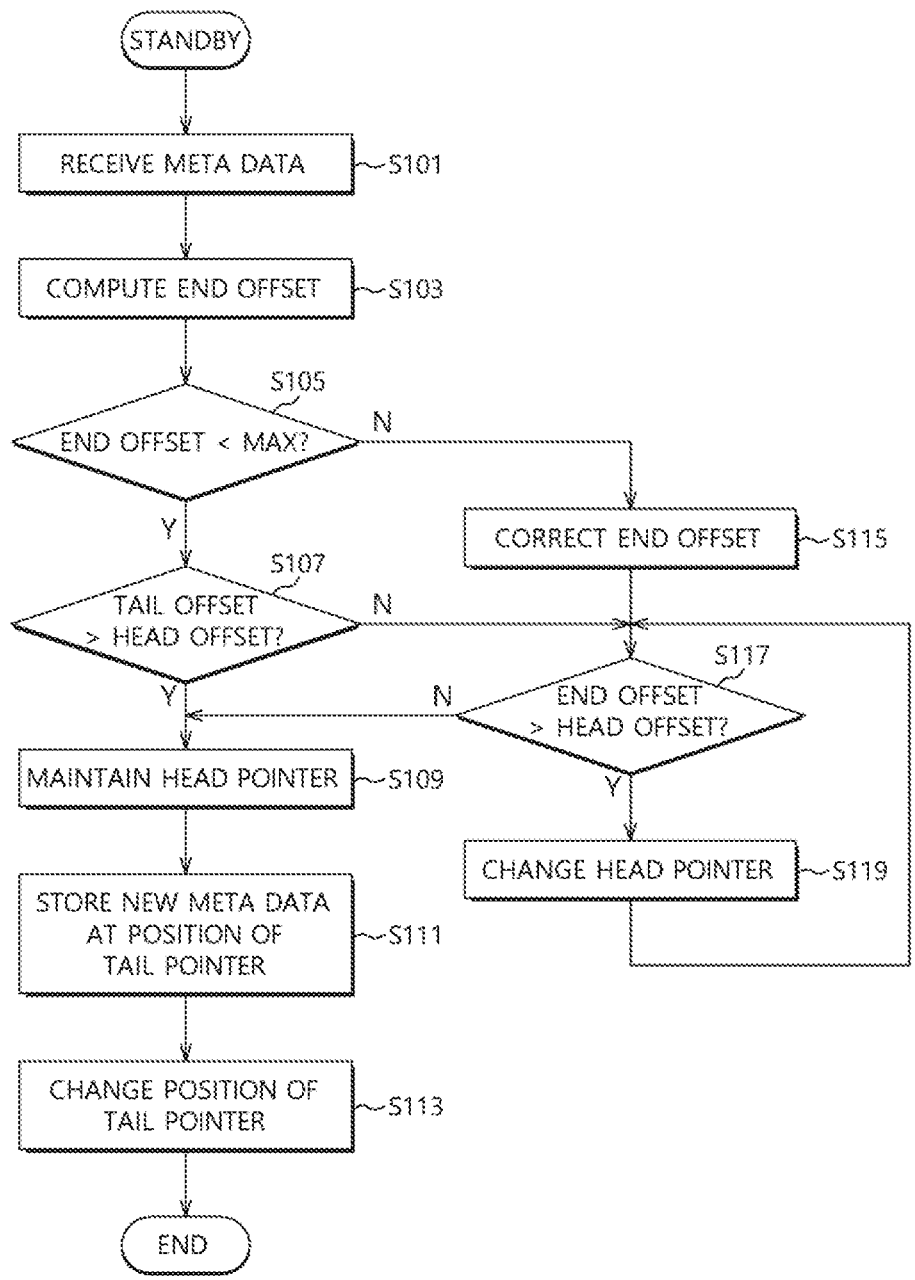
FIG. 5 is a flowchart illustrating an operation method of a data storage device in accordance with an embodiment.

FIG. 5 is a flowchart illustrating an operation method of a data storage device, e.g., data storage device 10 of FIGS. 1 and 2, in accordance with an embodiment. FIG. 6 to FIG. 10 are diagrams illustrating examples of a meta data management method when new map data is added. The exemplary methods of FIGS. 6 to 10 may be performed by the controller 110 of FIGS. 1 and 2.

In the context of the meta data management method described below, it is assumed that initial map data is stored in the map cache, meta data corresponding to the map data is stored in the descriptor cache, and a head pointer and a tail pointer are assigned.

Referring to FIG. 5, as new map data is added and new meta data is transmitted to the data manager 30, the data manager 30 may receive the new meta data (S101), and the data manager 30 may compute an end offset on the basis of an index and a size included in the new meta data (S103).

The data manager 30 may determine whether the computed end offset is less than the maximum value of the map cache (MAX) (S105). When it is determined that the end offset is less than the maximum value of the map cache (S105, Y), that is, when the new map data can be stored in an area after an area indicated by the tail pointer of the map cache, the data manager 30 determines whether or not wraparound has occurred in the map cache (S107).

In order to determine whether or not such wraparound has occurred, the data manager 30 may confirm whether a tail offset is greater than a head offset (S107).

When the end offset (or the tail offset) of meta data corresponding to final map data is greater than the head offset, indicating that wraparound has not occurred, the data manager 30 may substantially maintain the position of the head pointer as is (S109). Then, the data manager 30 may store the new meta data in a descriptor cache area indicated by the tail pointer (S111) and change the position of the tail pointer (S113).

Figure 6:
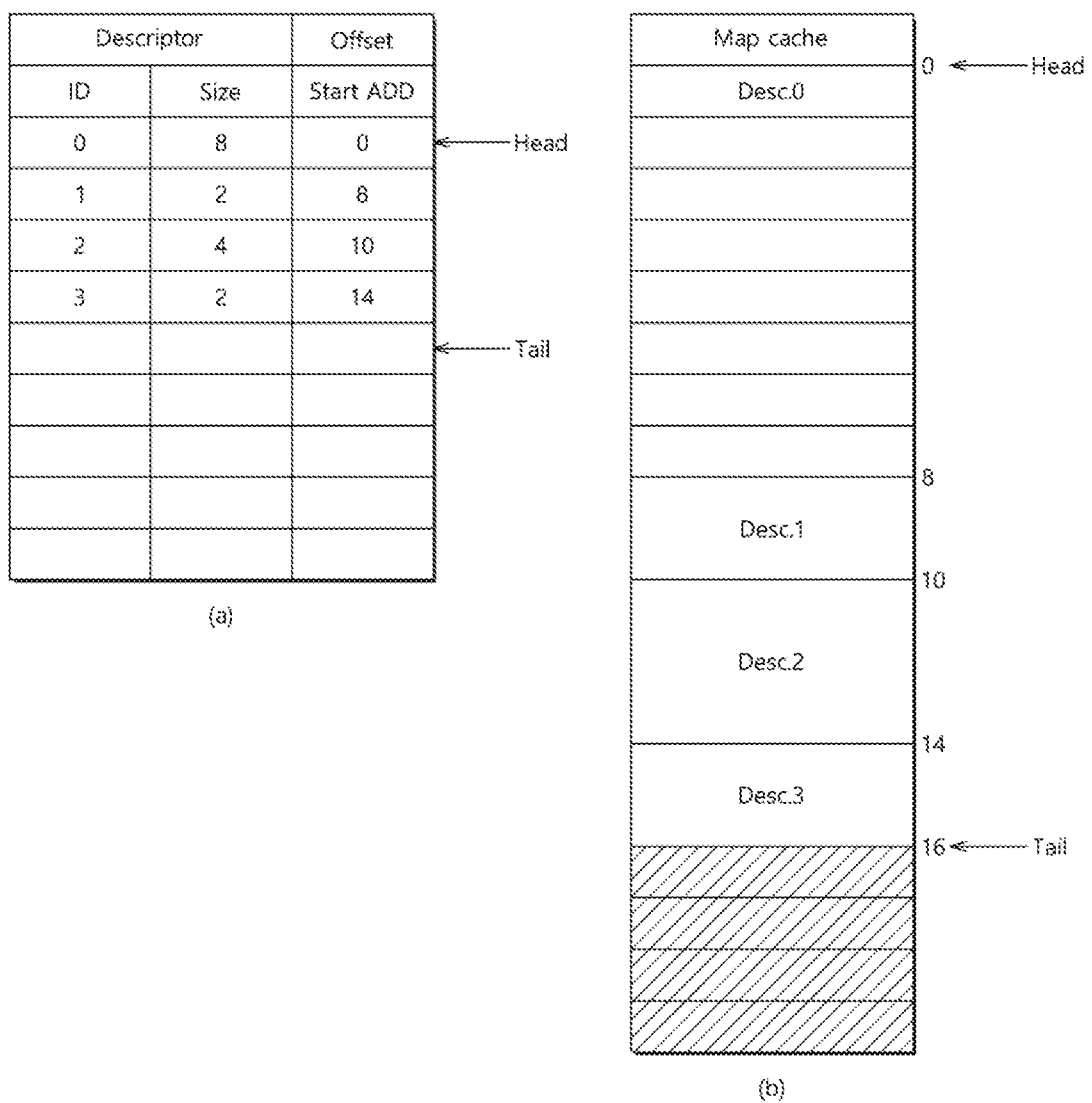
FIG. 6 to FIG. 10 are diagrams illustrating examples of a meta data management method when new map data is added.

Referring to FIG. 6, four pieces of map data may be stored in the map cache (a) and four pieces of meta data corresponding to the map data may be stored in the descriptor cache (b). In this state, when new map data is generated, the descriptor Desc.4 of meta data corresponding to the new map data may have an offset of 16 and a size of 1 as illustrated in FIG. 7.

Figure 7:
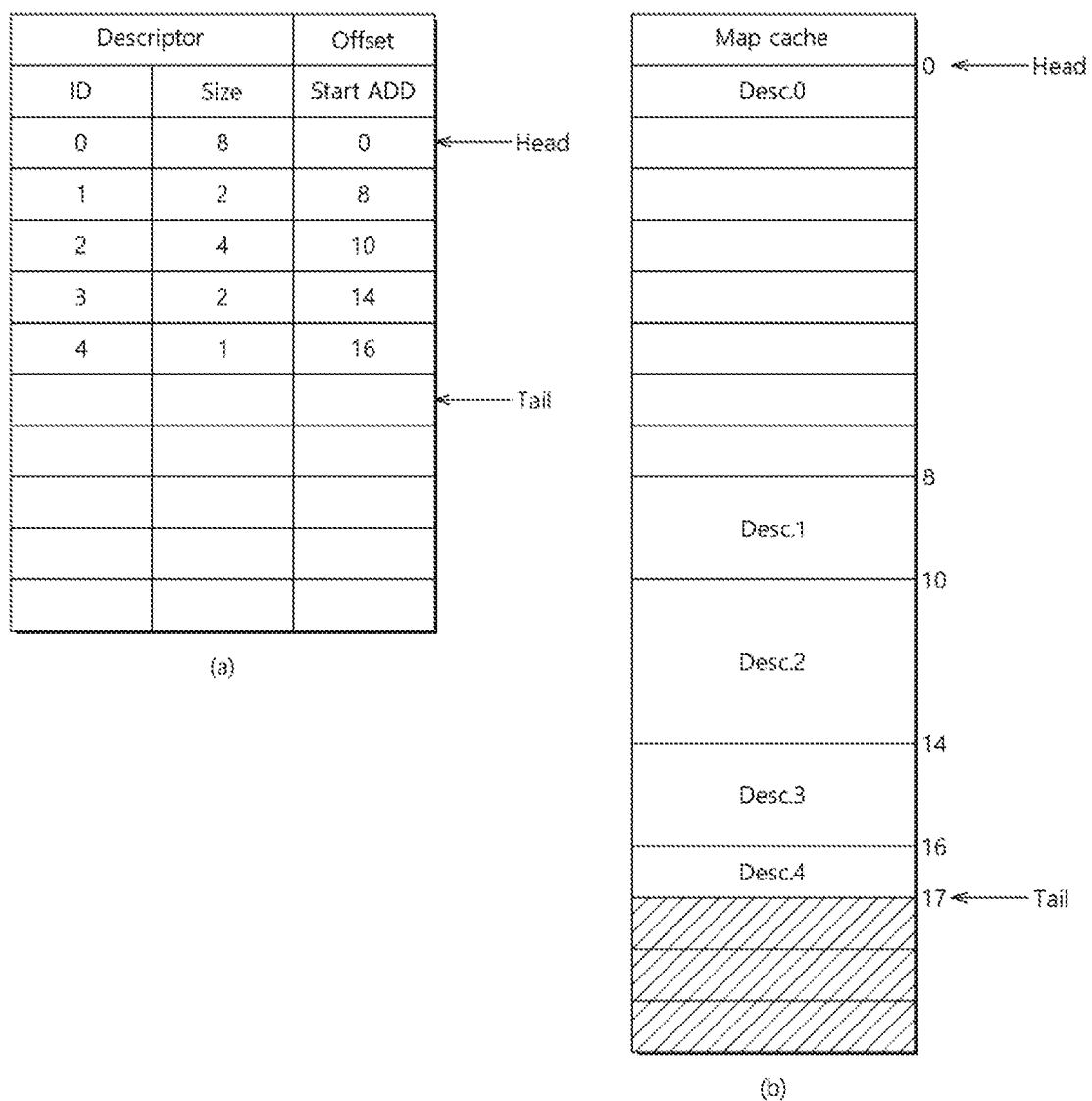

Referring to FIG. 7 in conjunction with FIG. 5, when the maximum value of the map cache (MAX) is 20, the end offset of the new meta data (ID=4) is 17, which is less than the maximum value MAX of the map cache (S105: Y), and the tail offset (i.e., the end offset=16 of the meta data 3 (ID=3)) is greater than the head offset (i.e., the offset=0 of the meta data (ID=0) indicated by the head pointer) (S107: Y), as a consequence, the position of the head pointer may be maintained substantially as is (S109).

Further, the data manager 30 may store the new meta data (ID=4) at the position of the tail pointer (S111) and increase the tail pointer (S113).

Referring back to FIG. 5, when it is determined that the end offset is greater than the maximum value of the map cache (MAX) (S105: N), the data manager 30 may correct the end offset (S115). The correction of the end offset may be performed in a manner such that the maximum value of the map cache is subtracted from the end offset.

Then, the data manager 30 may compare the computed end offset or the corrected end offset with the head offset (S117).

When the computed or corrected end offset is greater than the head offset, the data manager 30 changes (or increases) the position of the head pointer (S119). This process may be repeated until the computed or corrected end offset is less than the head offset.

When the computed or corrected end offset is less than the head offset, the data manager 30 may maintain the position of the head pointer substantially as is (S109), and store and change the position of the tail pointer (S111 and S113).

Figure 8:
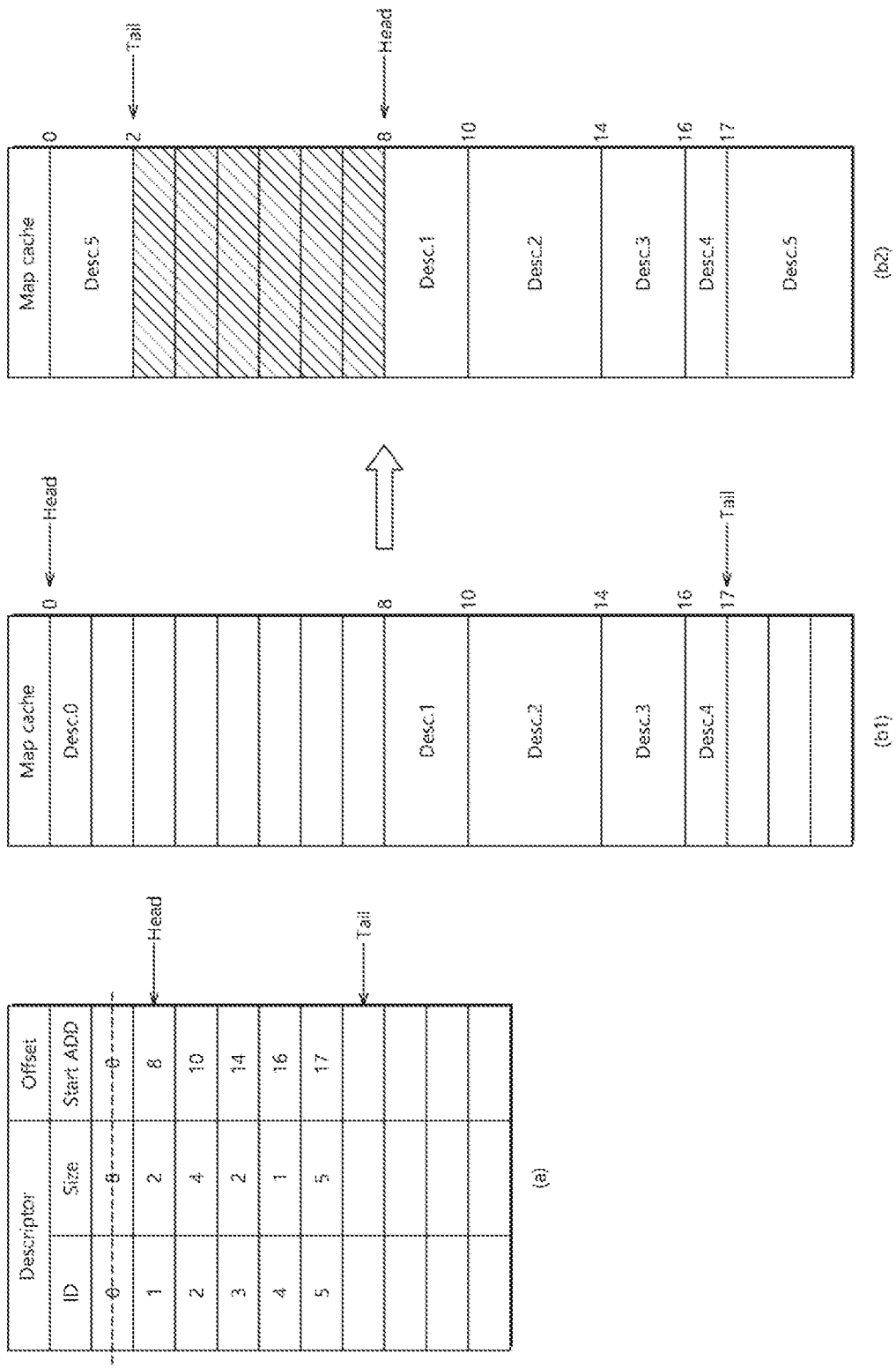

FIG. 8 illustrates a case in which meta data (ID=5) for the new map data corresponding to Desc.5 is added to the descriptor cache (a). (b1) illustrates the map cache before the new map data corresponding to Desc.5 is added, and (b2) illustrates the map cache after the new meta data is added.

Referring to FIG. 8, the end offset is 22 (=17+5), which corresponds to the sum of the previous end offset 17 and the size of the new data 5. Since the end offset 22 is greater than 20, which is the maximum value of the map cache, the end offset is corrected to 2 (=22−20). Since the corrected end offset 2 is greater than the head offset 0, the position of the head pointer may be increased from the initial map area 0 to a next map area 8 (S119).

Figure 9:
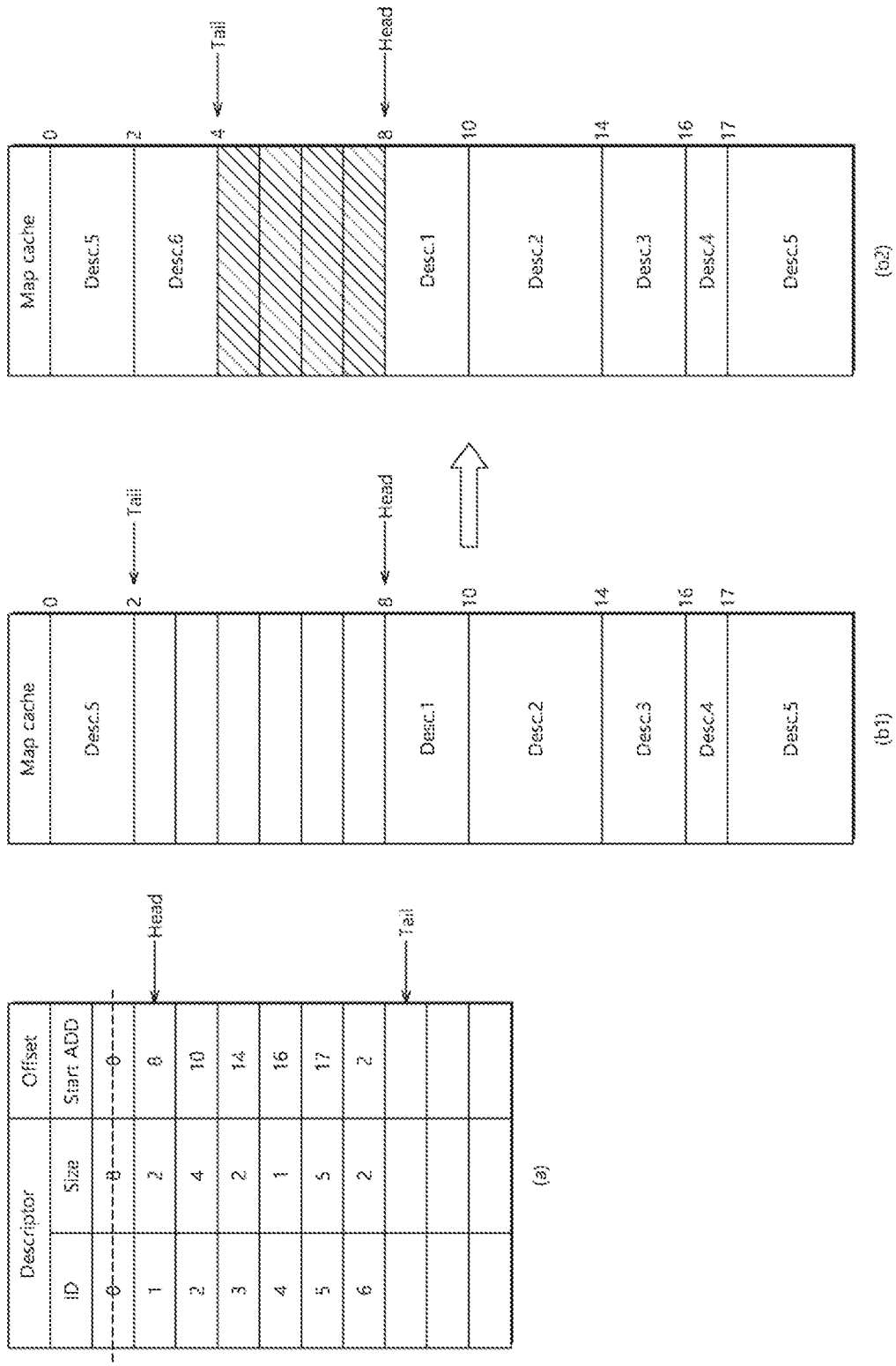

FIG. 9 illustrates a case in which meta data (ID=6) for the new map data corresponding to Desc.6 is added to the descriptor cache (a). In FIG. 9, (b1) illustrates the map cache before adding new map data corresponding to Desc.6, and (b2) illustrates the map cache after adding the new meta data.

Referring to FIG. 9, the end offset of the new meta data (ID=6) is 4 (=2+2), which is the sum of the previous end offset 2 and the size of the new data 2. The end offset of the new meta data (ID=6) is less than the maximum value of the map cache but the state of the map cache is after wraparound in which the tail offset of 2 is less than the head offset of 8. Furthermore, since the end offset of 4 is less than the head offset of 8, the position of the head pointer may be maintained substantially as is.

Figure 10:
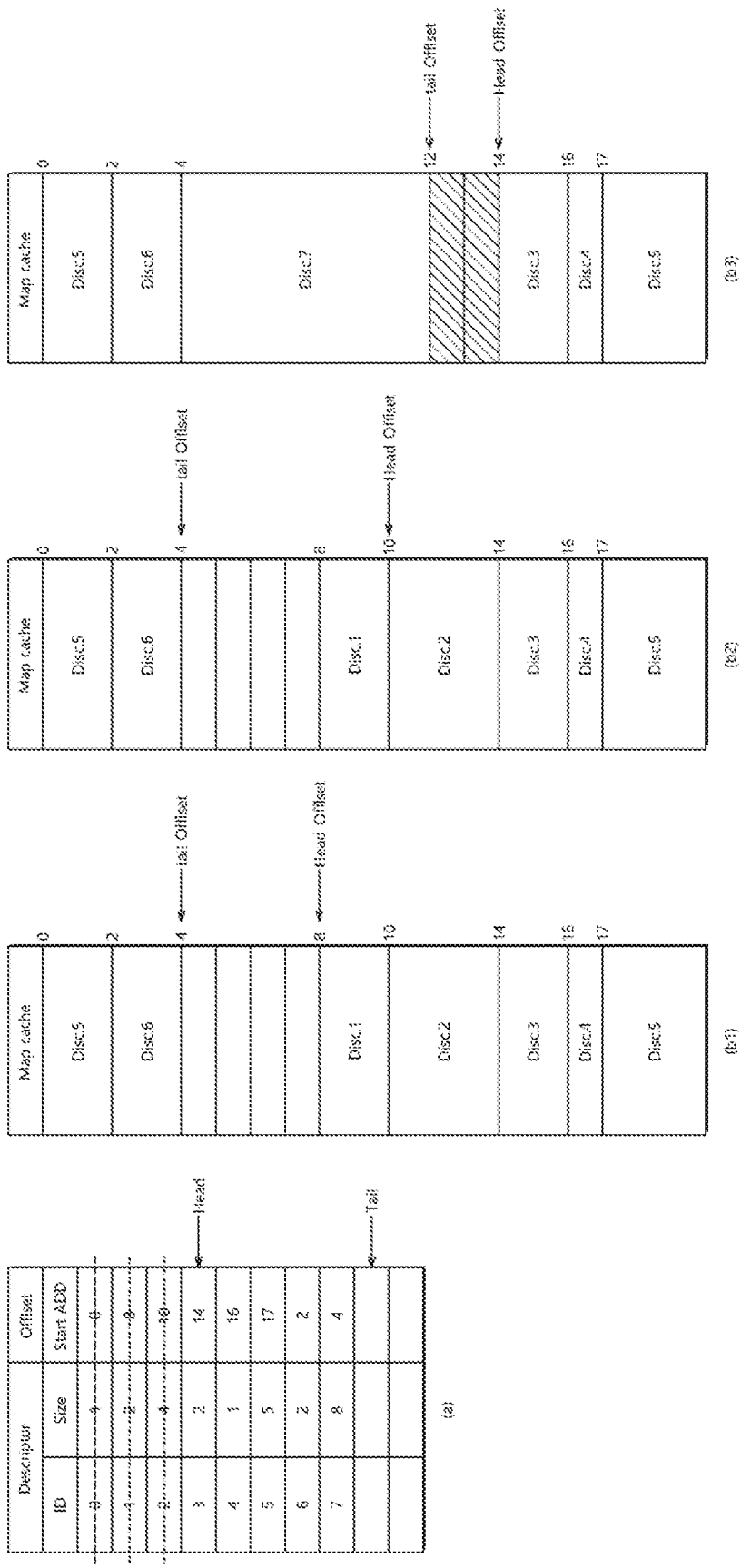

FIG. 10 illustrates a case in which new meta data (ID=7) for the new map data corresponding to Desc.7 is added in the descriptor cache (a). In FIG. 10, (b1) illustrates the map cache before adding new map data corresponding to Desc.7, and (b2) and (b3) illustrate the map cache after adding the new meta data.

Referring to FIG. 10, the end offset of the new meta data (ID=7) is 12, which corresponds to the sum of the previous end offset 4 and a data size 8. Since the end offset 12 of the new meta data (ID=7) is greater than the head offset of 8, the position of the head pointer is increased and changed to indicate the meta data (ID=2) as shown in (b2). However, since the end offset of 12 is still greater than the new position of the head offset 10, the position of the head pointer may be increased again and changed to indicate the meta data (ID=3) as shown in (b3).

Figure 10A:
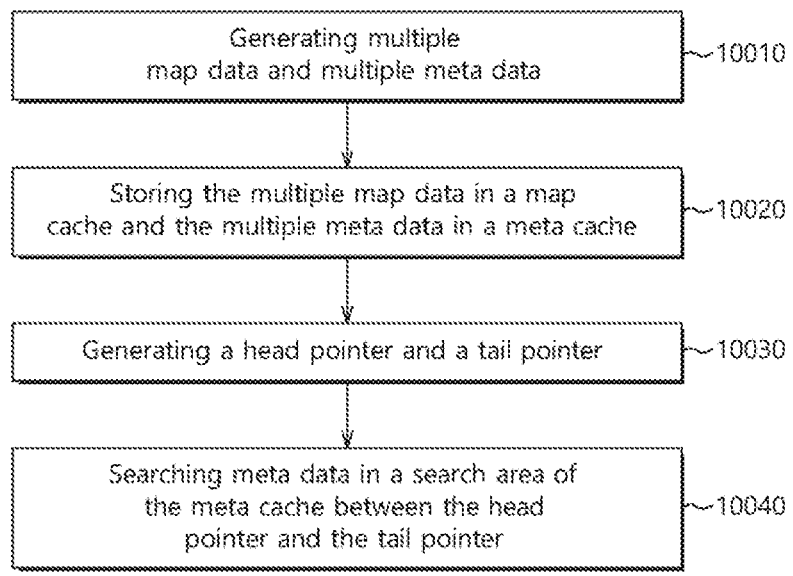
FIG. 10A is a flowchart illustrating an operation method of a data storage device in accordance with an embodiment.

FIG. 10A is a flowchart illustrating an operation method 10000 of a data storage device, e.g., data storage device 10 of FIGS. 1 and 2A, in accordance with an embodiment.

Referring to FIG. 10A, step 10010 may include generating multiple map data, each map data including a physical address of the storage corresponding to a logical address associated with the request, and multiple meta data, each meta data describing the corresponding map data and including information indicating an area of the map cache for corresponding map data.

Step 10020 may include storing the multiple map data in a map cache and the multiple meta data in a meta cache. In various embodiments, the meta cache may include a ring buffer to seamlessly store the multiple meta data.

Step 10030 may include generating a head pointer indicating a head area of the meta cache in which a first meta data among the multiple meta data is stored, and a tail pointer indicating where next meta data immediately following the last meta data is to be stored.

Step 10040 may include searching meta data in a search area of the meta cache between the head pointer and the tail pointer.

The operation method 10000 may further comprise searching map data in areas that are determined based on indication information of the meta data found in the search.

In various embodiments, each meta data includes a descriptor including identifier (ID) and size information of the corresponding map data, and the information indicating a start address of a corresponding area of the map cache for the corresponding map data. The descriptor further includes a compression rate of the corresponding map data and a logical address for the corresponding map data.

The method 10000 may further comprise, when next map data corresponding to the next meta data is generated and the map cache is not full, storing the next map data in a next area of the map cache; storing the next meta data in a tail area of the meta cache; maintaining the head pointer; and increasing the position of the tail pointer to indicate a next area of the meta cache, that is, the area immediately following the tail area.

The method 10000 may further comprise, when next map data corresponding to the next meta data is generated and the map cache is full, deleting first map data in a first area of the map cache; storing the next map data in the first area of the map cache; deleting first meta data in the head area of the meta cache; and storing the next meta data in the tail area of the meta cache. The method 500 may further comprise, increasing the position of the head pointer to indicate a second area of the meta cache, which is subsequent to the head area; and increasing the position of the tail pointer to indicate a next area of the meta cache, that is, the area immediately following the tail area.

As described above, in the present embodiments, the meta data corresponding to the map data is stored to be physically continuous in the descriptor cache, the initial storage position of the meta data is managed by a head pointer, and a position where new meta data is to be added is managed by a tail pointer.

When it is necessary to search for the map data, meta data having an index corresponding to a head value of a logical address may be found by searching from the head pointer to the tail pointer of the descriptor cache, and the map data may be extracted by accessing the map cache according to an offset and a size corresponding to the meta data. In addition, the extracted map data may be decoded on the basis of a compression rate stored in the meta data.

Figure 11:
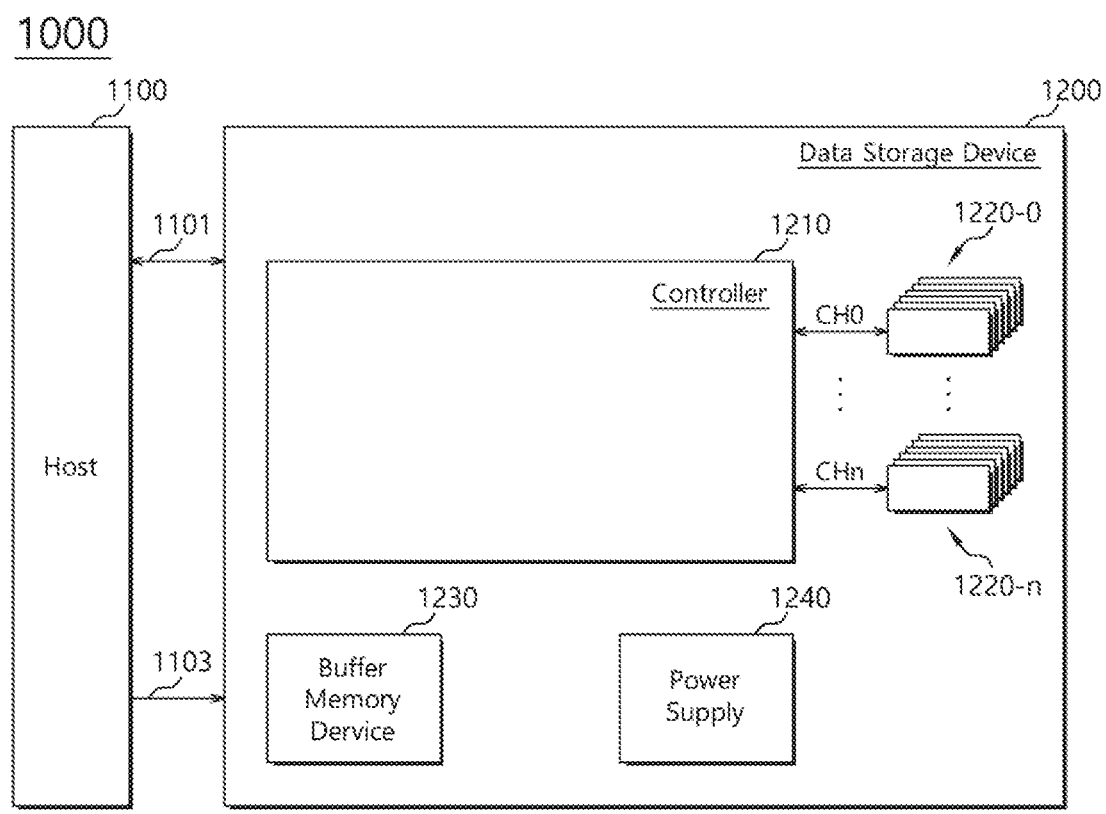
FIG. 11 is a diagram illustrating a data storage system in accordance with an embodiment.

FIG. 11 is a diagram illustrating a data storage system 1000 in accordance with an embodiment.

Referring to FIG. 11, the data storage 1000 may include a host device 1100 and the data storage device 1200. In an embodiment, the data storage device 1200 may be configured to a solid state drive (SSD).

The data storage device 1200 may include a controller 1210, a plurality of nonvolatile memory devices 1220-0 to 1220-*n*, a buffer memory device 1230, a power supply 1240, a signal connector 1101, and a power connector 1103.

The controller 1210 may control general operations of the data storage device 1200. The controller 1210 may include a host interface, a control component, a random access memory used as a working memory, an error correction code (ECC) circuit, and a memory interface. In an embodiment, the controller 1210 may configured as the controller 110 shown is FIG. 1 to FIG. 3.

The host device 1100 may exchange a signal with the data storage device 1200 through the signal connector 1101. The signal may include a command, an address, data, and other related information.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-*n*. Further, the buffer memory device 1230 may temporarily store the data read from at least one of the nonvolatile memory devices 1220-0 to 1220-*n*. The data temporarily stored in the buffer memory device 1230 may be transmitted to the host device 1100 or at least one of the nonvolatile memory devices 1220-0 to 1220-*n* according to control of the controller 1210.

The nonvolatile memory devices 1220-0 to 1220-*n* may be used as storage media of the data storage device 1200.

The nonvolatile memory devices 1220-0 to 1220-n may be coupled with the controller 1210 through a plurality of channels CH1 to CHn, respectively. One or more nonvolatile memory devices may be coupled to one channel. The nonvolatile memory devices coupled to the same channel may be coupled to the same signal bus and data bus.

The power supply 1240 may provide power inputted through the power connector 1103, to the inside of the data storage device 1200. The power supply 1240 may include an auxiliary power supply. The auxiliary power supply may supply power to allow the data storage device 1200 to be properly terminated when a sudden power-off occurs. The auxiliary power supply may include large capacity capacitors.

The signal connector 1101 may be configured by any of various types of connectors depending on an interface scheme between the host device 1100 and the data storage device 1200.

The power connector 1103 may be configured by any of various types of connectors depending on a power supply scheme of the host device 1100.

Figure 12:
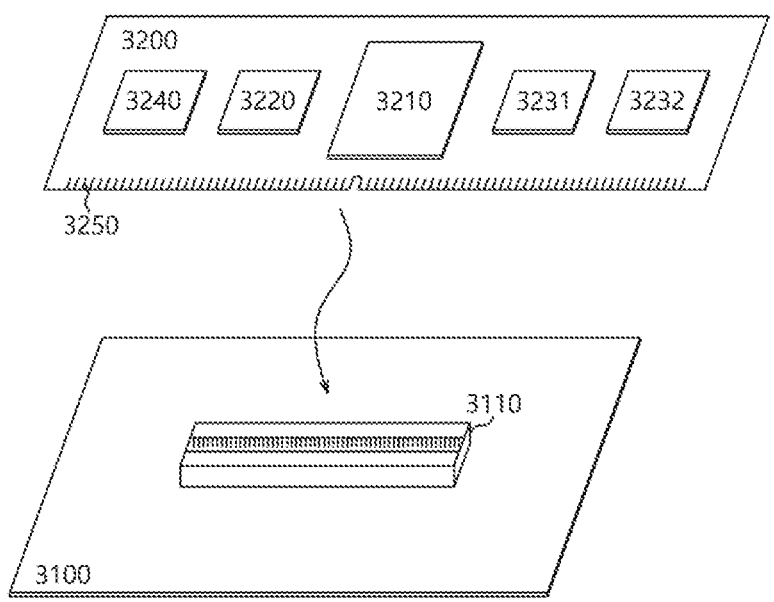
FIG. 12 and FIG. 13 are diagrams illustrating a data processing system in accordance with an embodiment.

FIG. 12 is a diagram illustrating a data processing system 3000 in accordance with an embodiment. Referring to FIG. 12, the data processing system 3000 may include a host device 3100 and a memory system 3200.

The host device 3100 may be configured in the form of a board such as a printed circuit board. Although not shown, the host device 3100 may include internal function blocks for performing various functions thereof.

The host device 3100 may include a connection terminal 3110 such as a socket, a slot or a connector. The memory system 3200 may be mounted to the connection terminal 3110.

The memory system 3200 may be configured in the form of a board such as a printed circuit board. The memory system 3200 may be configured as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 as shown in FIGS. 1 to 3.

The buffer memory device 3220 may temporarily store data to be stored in the nonvolatile memory devices 3231 and 3232. Further, the buffer memory device 3220 may temporarily store the data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250, to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data and the like and power may be transferred between the host device 3100 and the memory system 3200. The connection terminal 3250 may be configured as any of various types depending on an interface scheme between the host device 3100 and the memory system 3200. The connection terminal 3250 may be disposed on any one side of the memory system 3200.

Figure 13:
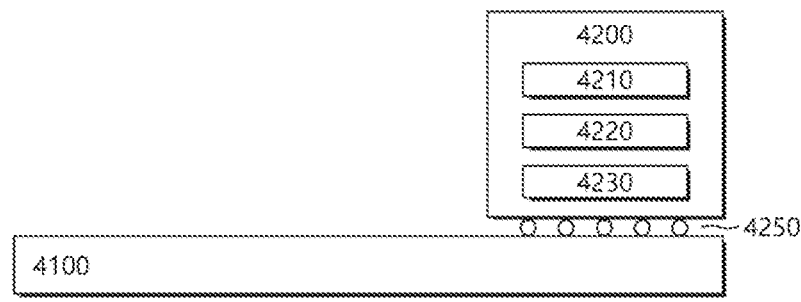

FIG. 13 is a diagram illustrating a data processing system 4000 in accordance with an embodiment. Referring to FIG. 13, the data processing system 4000 may include a host device 4100 and a memory system 4200.

The host device 4100 may be configured in the form of a board such as a printed circuit board. Although not shown, the host device 4100 may include internal function blocks for performing various functions thereof.

The memory system 4200 may be configured in the form of a surface-mounting type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 as shown in FIGS. 1 to 3.

The buffer memory device 4220 may temporarily store data to be stored in the nonvolatile memory device 4230. Further, the buffer memory device 4220 may temporarily store the data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 14:
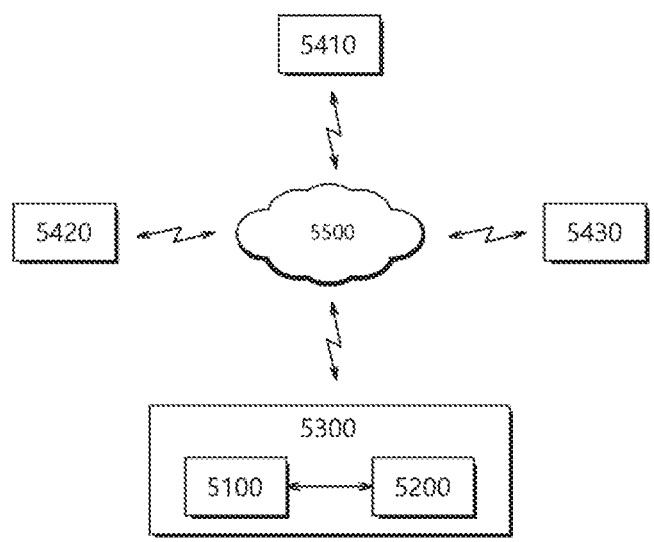
FIG. 14 is a diagram illustrating a network system including a data storage device in accordance with an embodiment.

FIG. 14 is a diagram illustrating a network system 5000 including a data storage device in accordance with an embodiment. Referring to FIG. 14, the network system 5000 may include a server system 5300 and a plurality of client systems 5410 to 5430 which are coupled through a network 5500.

The server system 5300 may service requests from the plurality of client systems 5410 to 5430. For example, the server system 5300 may store the data provided from the plurality of client systems 5410 to 5430. For another example, the server system 5300 may provide data to the plurality of client systems 5410 to 5430.

The server system 5300 may include a host device 5100 and a memory system 5200. The memory system 5200 may be configured by the memory system 10 shown in FIG. 1, the data storage device 1200 shown in FIG. 11, the memory system 3200 shown in FIG. 12 or the memory system 4200 shown in FIG. 13.

Figure 15:
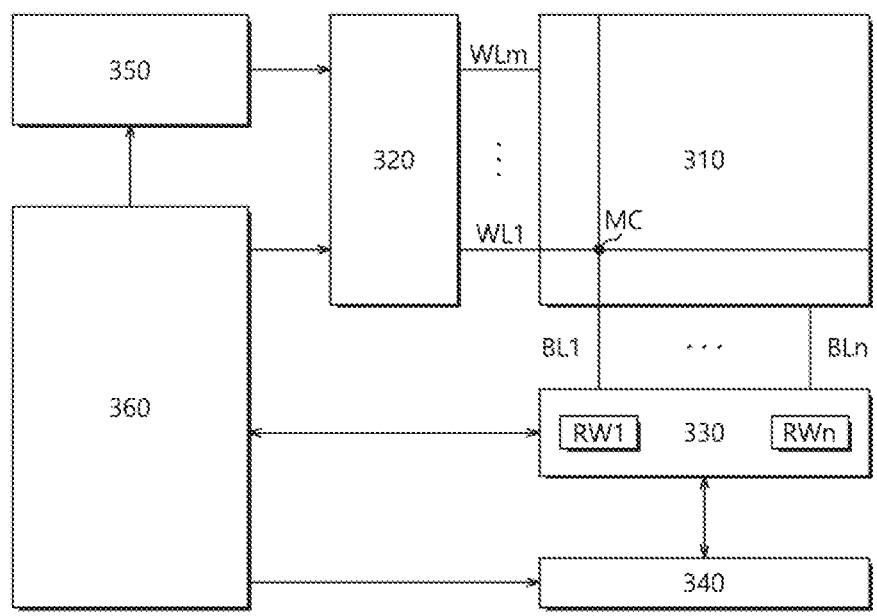
FIG. 15 is a block diagram illustrating a nonvolatile memory device included in a data storage device in accordance with an embodiment.

FIG. 15 is a block diagram illustrating a nonvolatile memory device 300 included in a data storage device in accordance with an embodiment. Referring to FIG. 15, the nonvolatile memory device 300 may include a memory cell array 310, a row decoder 320, a data read and write (read/write) block 330, a column decoder 340, a voltage generator 350, and control logic 360.

The memory cell array 310 may include memory cells MC which are arranged at areas where word lines WL1 to WLm and bit lines BL1 to BLn intersect with each other.

The memory cell array 310 may comprise a three-dimensional memory array, in which case it extends in a direction perpendicular to the flat surface of a semiconductor substrate. Moreover, the three-dimensional memory array indicates a structure including NAND strings in which memory cells positioned one after the other in a direction perpendicular to the flat surface of the semiconductor substrate.

The structure of the three-dimensional memory array is not limited to the specifics described above but may be realized in other ways such as the memory cells extending at an angle to the surface of the semiconductor substrate. As understood by those skilled in the art, the memory array structure can be formed in a highly integrated manner with horizontal directionality as well as vertical directionality.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

While various embodiments have been illustrated and described, it will be understood by those skilled in the art in light of the present disclosure that the embodiments described are examples only. Accordingly, the present invention is not limited to any of the disclosed embodiments nor to specific details. Rather, the present invention encompasses all variations and modifications of the disclosure that fall within the scope of the claims.

What is claimed is:

1. A data storage device comprising:
a storage; and
a controller configured to control the storage in response to a request received from a host device,
wherein the controller comprises:
an address translator configured to generate multiple map data, each including a physical address of the storage, the physical address corresponding to a logical address of a write request from the host device, and generate multiple meta data, each including a) an index indicating a head value of the logical address of the corresponding map data and b) an offset and size of the map data associated with the head value;
a descriptor cache manager configured to store the meta data and add new meta data to a storage area of a descriptor cache, the storage area for the new meta data being physically continuous with a storage area in which last meta data, of the multiple meta data, is stored and assign a head pointer and a tail pointer to select positions in the descriptor cache;
a map cache manager configured to store the multiple map data in a map cache; and
a map search component configured to search the descriptor cache according to a search range determined by the head pointer and the tail pointer and to search the meta data in the descriptor cache for the index containing the head value of the logical address of the corresponding map data,
wherein the controller is configured to extract the map data from the storage based on the head value, the offset, and the size of the map data contained in the meta data in the descriptor cache.

2. The data storage device according to claim 1, wherein each meta data further includes a compression rate of the corresponding map data, a size of the corresponding map data, and offset information indicating a start address of the map cache where the corresponding map data is stored.

3. The data storage device according to claim 1, wherein the descriptor cache includes a ring buffer.

4. The data storage device according to claim 1, wherein each meta data includes a size of the corresponding map data and offset information indicating a start address of the map cache where the corresponding map data is stored, and
the descriptor cache manager is configured to assign the head pointer to indicate a first area where initial meta data is stored, maintain or change the position of the head pointer as new meta data is added, assign the tail pointer to an area where new meta data is to be added, the area in which the new meta data is to be added being physically continuous with the first area, and change the position of the tail pointer as new meta data is added.

5. The data storage device according to claim 4, wherein, as new meta data corresponding to new map data is generated, the descriptor cache manager is configured to store the new meta data at a position of the tail pointer, change the position of the tail pointer to a position indicating a next area in the descriptor cache, and maintain or change a position of the head pointer on the basis of an offset and a size of the new map data.

6. The data storage device according to claim 4, wherein the descriptor cache manager is configured to maintain or change the position of the head pointer according to a result obtained by comparing an end offset, computed based on an offset and a size of new map data, with an offset of map data corresponding to meta data indicated by the head pointer.

7. The data storage device according to claim 4, wherein the descriptor cache manager is configured to maintain the position of the head pointer when an end offset, computed based on an offset and a size of new map data, is less than a maximum value of the map cache before wraparound occurs in the map cache.

8. The data storage device according to claim 7, wherein, after wraparound occurs in the map cache, the descriptor cache manager is configured to maintain or change the position of the head pointer according to a result obtained by comparing the end offset with a head offset indicating an offset of map data corresponding to meta data indicated by the head pointer.

9. The data storage device according to claim 7, wherein the descriptor cache manager is configured to determine whether or not wraparound has occurred in the map cache according to a result obtained by comparing a tail offset, which is an end offset of last stored meta data, with a head offset which is an offset of map data corresponding to meta data indicated by the head pointer.

10. The data storage device according to claim 4, wherein the descriptor cache manager is configured to correct an end offset when it is greater than a maximum value of the map cache, and maintain or change the position of the head pointer according to a result obtained by comparing the end offset or the corrected end offset with an offset of map data corresponding to meta data indicated by the head pointer.

11. An operation method of a data storage device including a storage and a controller, the operation method comprising:
generating, by the controller, multiple map data, each including a physical address of the storage, the physical address corresponding to a logical address of a write request from a host device, and generating multiple meta data, each including a) an index indicating a head value of the logical address of the corresponding map data and b) an offset and size of the map data associated with the head value;
adding, by the controller, the meta data and new meta data to a storage area of a descriptor cache, the storage area for the new meta data being physically continuous with a storage area in which last meta data, of the multiple meta data, is stored;
assigning, by the controller, a head pointer and a tail pointer to select positions in the descriptor cache;
storing, by the controller, the multiple map data in a map cache;
searching, by the controller, the descriptor cache according to a search range determined by the head pointer and the tail pointer and searching the meta data in the descriptor cache for the index containing the head value of the logical address of the corresponding map data; and
extracting the map data from the storage based on the head value, the offset, and the size of the map data contained in the meta data in the descriptor cache.

12. The operation method according to claim 11, wherein the meta data further includes a compression rate of the corresponding map data, a size of the corresponding map data, and offset information indicating a start address of the map cache where the corresponding map data is stored.

13. The operation method according to claim 11, wherein each meta data includes a size of the corresponding map data and offset information indicating a start address of the map cache where the corresponding map data is stored, and
wherein the assigning of the head pointer and the tail pointer includes assigning the head pointer to indicate a first area where initial meta data is stored, maintaining or changing the position of the head pointer as new meta data is added, assigning the tail pointer to an area where new meta data is to be added, the area in which the new meta data is to be added being physically continuous with the first area, and changing the position of the tail pointer as new meta data is added.

14. The operation method according to claim 13, wherein, as new meta data corresponding to new map data is generated, the new meta data is stored at a position of the tail pointer, the position of the tail pointer is changed to a position indicating a next area in the descriptor cache, and a position of the head pointer is maintained or changed on the basis of an offset and a size of the new map data.

15. The operation method according to claim 13, wherein the position of the head pointer is maintained when an end offset, computed based on an offset and a size of new map data, is less than a maximum value of the map cache before wraparound occurs in the map cache.

16. The operation method according to claim 15, wherein, after wraparound occurs in the map cache, the position of the head pointer is maintained or changed according to a result obtained by comparing the end offset with a head offset indicating an offset of map data corresponding to meta data indicated by the head pointer.

17. The operation method according to claim 15, further comprising: determining whether or not wraparound has occurred in the map cache by comparing a tail offset, which is an end offset of last stored meta data, with a head offset which is an offset of map data corresponding to meta data indicated by the head pointer.

18. The operation method according to claim 13, wherein the assigning of the head pointer and the tail pointer includes: correcting an end offset when it is greater than a maximum value of the map cache, and maintaining or changing the position of the head pointer according to a result obtained by comparing the end offset or the corrected end offset with an offset of map data corresponding to meta data indicated by the head pointer.

19. A data storage device comprising:
a storage; and
a controller suitable for controlling the storage in response to a write request from a host device,
wherein the controller comprises:
a data generator suitable for generating multiple map data, each map data including a physical address of the storage, the physical address corresponding to a logical address of the write request from the host device, and for generating multiple meta data, each including a) an index indicating a head value of the logical address of the corresponding map data and b) an offset and size of the map data associated with the head value;
a map cache suitable for storing the multiple map data;
a meta cache suitable for storing the multiple meta data, each meta data including indication information indicating an area of the map cache for corresponding map data;
a data manager suitable for storing the multiple map data in the map cache, storing the multiple meta data in the meta cache, generating a head pointer indicating a head area of the meta cache in which first meta data among the multiple meta data is stored, and a tail pointer indicating a tail area of the meta cache in which next meta data immediately subsequent to last meta data among the multiple meta data is to be stored, searching the meta data in a search area of the meta cache between the head pointer and the tail pointer, and searching the meta data in the meta cache for the index containing the head value of the logical address of the corresponding map data,
wherein the controller is configured to extract the map data from the storage based on the head value, the offset, and the size of the map data contained in the meta data in the meta cache.

20. The data storage device of claim 19, wherein the data manager searches map data in areas, which are determined based on the indication information of meta data found in the searching operation.

21. The data storage device of claim 19, wherein each meta data includes a descriptor including an identifier (ID) and size information of the corresponding map data, and the indication information indicating a start address of an area of the map cache for the corresponding map data.

22. The data storage device of claim 21, wherein the descriptor further includes a compression rate of the corresponding map data and a logical address for the corresponding map data.

23. The data storage device of claim 19, wherein the meta cache includes a ring buffer.

24. The data storage device of claim 23, wherein the meta cache seamlessly stores the multiple meta data.

25. The data storage device of claim 24, wherein, when next map data corresponding to the next meta data is generated and the map cache is not full,
the data manager stores the next map data in a next area of the map cache, stores the next meta data in the tail area of the meta cache, maintains the head pointer and increases the tail pointer to indicate a next area of the meta cache that is immediately subsequent to the tail area.

26. The data storage device of claim 24, wherein, when next map data corresponding to the next meta data is generated and the map cache is full,
the data manager deletes first map data in a first area of the map cache, stores the next map data in the first area of the map cache, deletes first meta data in the head area of the meta cache, and stores the next meta data in the tail area of the meta cache.

27. The data storage device of claim 26, wherein the data manager increases the head pointer to indicate a second area of the meta cache, the second area being subsequent to the head area and increases the tail pointer to indicate a next area of the meta cache that is immediately subsequent to the tail area.

28. A method for operating a data storage device, the method comprising:
generating multiple map data, each map data including a physical address of a storage of the data storage device, the physical address corresponding to a logical address of a write request from a host device, and generating multiple meta data for the multiple map data respectively, each meta data including indication information indicating an area of the map cache for corresponding map data and including a) an index indicating a head value of the logical address of the corresponding map data and b) an offset and size of the map data associated with the head value;
storing the multiple map data in a map cache and the multiple meta data in a meta cache;
generating a head pointer indicating a head area of the meta cache in which first meta data among the multiple meta data is stored, and a tail pointer indicating a tail area of the meta cache in which next meta data immediately subsequent to last meta data among the multiple meta data is to be stored;
searching meta data in a search area of the meta cache between the head pointer and the tail pointer and searching the meta data in the meta cache for the index containing the head value of the logical address of the corresponding map data; and
extracting the map data from the storage based on the head value, the offset, and the size of the map data contained in the meta data in the meta cache.

29. The method of claim 28, further comprising: searching map data in areas, which are determined based on the indication information of meta data found in the searching operation.

30. The method of claim 28, wherein each meta data includes a descriptor including an identifier (ID) and size information of the corresponding map data, and the indication information indicating a start address of a corresponding area of the map cache for the corresponding map data.

31. The method of claim 30, wherein the descriptor further includes a compression rate of the corresponding map data and a logical address for the corresponding map data.

32. The method of claim 28, wherein the meta cache includes a ring buffer.

33. The method of claim 32, wherein the meta cache seamlessly stores the multiple meta data.

34. The method of claim 33, further comprising:
when a next map data corresponding to the next meta data is generated and the map cache is not full,
storing the next map data in a next area of the map cache;
storing the next meta data in the tail area of the meta cache;
maintaining the head pointer; and
increasing a position of the tail pointer to indicate a next area of the meta cache that is immediately subsequent to the tail area.

35. The method of claim 33, further comprising:
when next map data corresponding to the next meta data is generated and the map cache is full,
deleting first map data in a first area of the map cache;
storing the next map data in the first area of the map cache;
deleting first meta data in the head area of the meta cache; and
storing the next meta data in the tail area of the meta cache.

36. The method of claim 35, further comprising:
increasing a position of the head pointer to indicate a second area of the meta cache, the second area being subsequent to the head area; and
increasing a position of the tail pointer to indicate a next area of the meta cache that is immediately subsequent to the tail area.

* * * * *